United States Patent [19]

Keys

[11] Patent Number: 4,916,873
[45] Date of Patent: Apr. 17, 1990

[54] WINDSHIELD REVEAL MOLDING WITH CORE STRUCTURE

[75] Inventor: James F. Keys, W. Bloomfield, Mich.

[73] Assignee: The Standard Products Company, Cleveland, Ohio

[21] Appl. No.: 307,345

[22] Filed: Feb. 6, 1989

[51] Int. Cl.⁴ .............................................. E06B 3/00
[52] U.S. Cl. ......................................... 52/208; 52/400; 296/93
[58] Field of Search ............. 52/208, 400, 397, 309.16; 296/93

[56] References Cited

U.S. PATENT DOCUMENTS

| 2,736,404 | 2/1956 | Clingman | 189/78 |
| 2,763,345 | 9/1956 | Clingman et al. | 189/78 |
| 4,627,145 | 12/1986 | Niemanns | 52/400 X |
| 4,813,733 | 3/1989 | Gustafson et al. | 52/400 X |

FOREIGN PATENT DOCUMENTS

| 2818755 | 8/1979 | Fed. Rep. of Germany | 2/ |
| 0259522 | 12/1985 | Japan | 296/93 |
| 0214012 | 9/1987 | Japan | 296/93 |

Primary Examiner—Carl D. Friedman
Attorney, Agent, or Firm—Harness, Dickey & Pierce

[57] ABSTRACT

A glass reveal molding having a C-shaped clamping portion which applies a substantially even pressure on the windshield is disclosed. The equalized pressure of the clamping portion will substantially eliminate gapping around the radius and retain the molding on the windshield without gapping or rolling on the molding. The molding may include a mechanism to enable increased bonding area of the molding and the windshield. Also, the molding may include a metallic strip with one or more fingers forming one of the legs of the C-shaped retaining member. Also, a member to secure the molding onto the vehicle body may be included with the molding.

8 Claims, 2 Drawing Sheets

WINDSHIELD REVEAL MOLDING WITH CORE STRUCTURE

BACKGROUND AND SUMMARY OF THE INVENTION

The present invention relates generally to edge moldings for window panels. More particularly, the present invention relates to a molding for a fixed window of an automobile vehicle such as a windshield or backlite. The molding bridges the space between the edge of the window panel and the adjacent body panel.

Automotive windshields and backlites are commonly mounted to the associated vehicle body in a manner which leaves a space between the periphery of the glass panel and the body panel. This space is covered by a molding referred to as a windshield or backlite reveal molding. In covering the space between the glass panel and vehicle body, a reveal molding serves to improve the visual appearance of the automotive vehicle and reduce wind noise.

To present the best visual appearance, reveal moldings must extend evenly around the space between the glass panel and body panel and must be able to accommodate spaces having varying widths. Reveal molding should also be able to curve around the radius of the glass panel without detaching from the edge of the glass panel or twisting to become disengaged from the glass panel or body panel. Reveal molding also should resist fluttering in the relative wind.

Many molding designs for attachment to the edges of automotive glass panels are of a single piece, asymmetrical construction. When such moldings are attached around the radius of a glass panel edge the clamping pressure of the two opposing molding surfaces is uneven due to the difference of resistance between the mass of material above and below the center axis of the glass. This difference in resistance can cause gapping of one gripper or the other resulting in a loss of uniform gripping about the radius. Loss of gripping can result in detachment of the molding from the glass edge and a rolling of the molding away from the surface of the glass or from the surface of the vehicle body. This result is unsightly and defeats the cosmetic function of the molding as well as increasing the possibility of the molding becoming snagged and pulled out.

In accordance with the present invention, a glass reveal molding has a symmetrical generally C-shaped clamping portion which exerts substantially even gripping pressure on both top and bottom surfaces of the glass. The equalized pressure of the clamping portion will substantially eliminate gapping around the radius and retain the molding on the windshield without gapping or rolling of the molding. The clamping portion may include a mechanism for increasing the bonding area of the clamping portion. Also, a metallic strip with one or more flanges may form a portion of the C-shaped clamping portion. Further, a mechanism for securing the molding to the vehicle body may be coupled with the molding.

The molding also has a crown with a stabilizing tail that nests with the C-shaped clamping portion. The tail stabilizer prevents the crown from tilting up or down around the radius of the glass but the tail stabilizer allows the crown to seat against the vehicle body. This is achieved because the tail stabilizer presses against the C-shaped clamping portion when the molding is applied around a radius. Without the tail stabilizer the crown would tip up or down when the molding is applied around a glass radius.

Further understanding of the present invention will be had from the following description of preferred embodiments taken in conjunction with the attached drawings and appended claims.

DESCRIPTION OF THE PREFERRED EMBODIMENT

Figure 1:
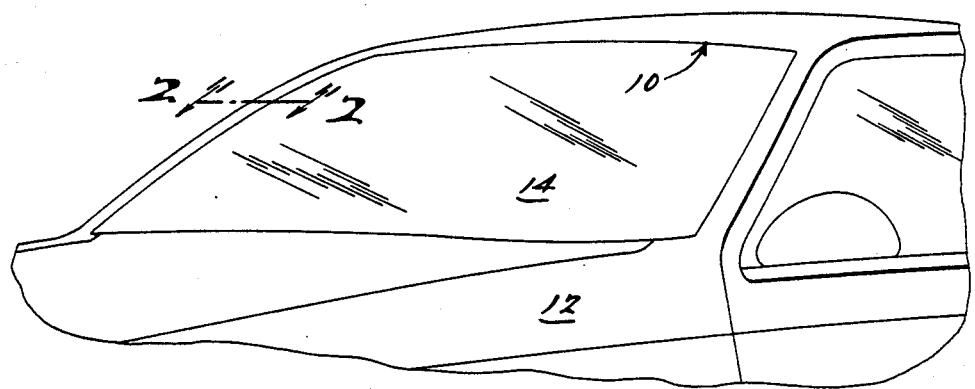
FIG. 1 is a perspective view illustrating a reveal molding of the present invention in place about the periphery of a windshield of an automotive vehicle.

Referring to the figures, clamp-on glass moldings of the present invention are illustrated. FIG. 1 shows clamp-on glass molding 10 in operative association with automobile 12 as a windshield reveal molding. The clamp-on glass molding 10 extends around the sides and top of windshield 14 to cover the space between a conventionally installed windshield 14 and the body panel 15 of automobile 12. It will, of course, be appreciated by those skilled in the art that clamp-on molding 10 is well-suited for use as an automotive windshield reveal molding or backlite reveal molding but also has molding uses both inside and outside the automotive field. The present invention is similar to U.S. patent application Ser. No. 102,385, filed Sept. 29, 1987, entitled "Clamp-On Glass Molding", assigned to the same Assignee as the present invention, the specification of which is herein incorporated by reference.

Clamp-on glass molding 10 is comprised of a suitable elastomeric material and is an elongated molding broadly comprising, in cross-section, a C-shaped clamping portion 16 and a crown 18, both of which can be comprised of polyvinylchloride or other suitable elastomeric material as is common in the art. For example, clamping portion 16 and crown 18 can be coextruded and comprised of polyvinylchloride of a hardness of durometer shore A 90 and 85, respectively.

C-shaped clamping portion 16 includes a pair of legs 20 and 22 connected by a web 24. The legs 20 and 22 provide an even clamping pressure on opposite surfaces 26 and 28 of the windshield 14. This equalized pressure or force of the C-shaped clamping portion 16 reduces the problem of gapping and twisting around the radius of the windshield and enhances retention of the molding on the windshield without rolling or gapping of the molding. Thus, problems with respect to detachment of the molding from the glass edge or a rolling of the molding away from the glass edge are minimized.

The leg 22 includes one or more notches 30 which divides the leg 22 into a plurality of fingers 32 therein. The notches 30 may be in designated areas, such as at the portions corresponding to the curves 32 of the windshield 14 or may be continuous along the molding.

The fingers 32 increase the bending area of the molding with respect to the windshield 14 for securing the molding 10 and windshield 14 in position. An adhesive 34 such as a hot melt adhesive can be provided for additional retention of clamp-on glass molding 10 on the edge of windshield 14. The C-shaped clamping portion 16 also includes a bottom nip 36. The bottom nip 36 is located on the neutral axis of the clamp-on glass molding 10 when applied to the windshield 14. The bottom nip 36 allows the adhesive 34 to flow around the bottom nip 36 to mechanically lock the clamp-on glass molding 10 in place when the adhesive 34 hardens.

Figure 2:
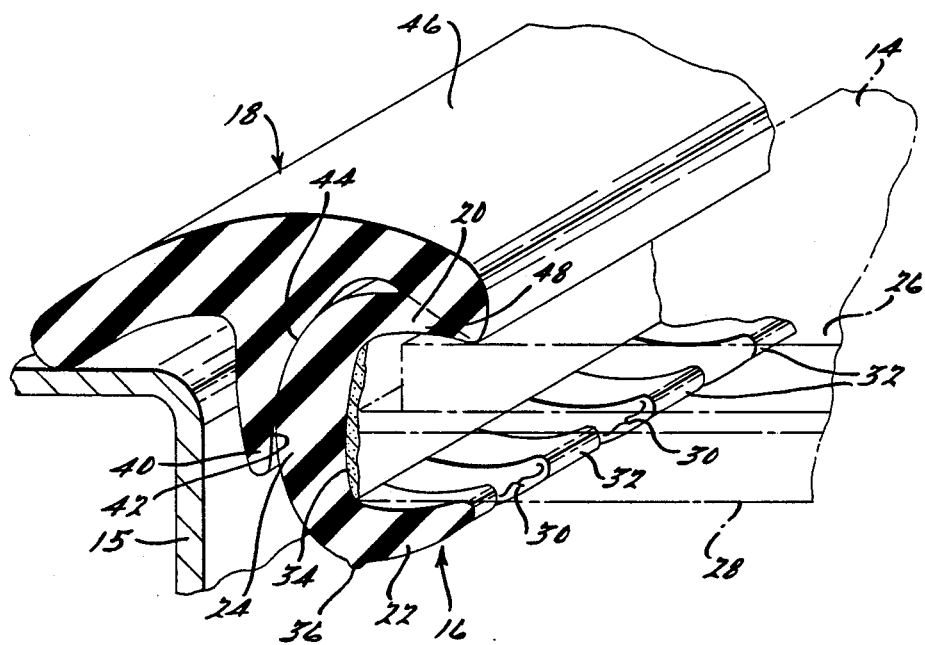
FIG. 2 is a perspective partially in cross-section view, broken away, showing a preferred embodiment of a reveal molding in accordance with the present invention.

Crown 18 provides an umbrella-shaped cover which extends across the space between windshield 14 and the adjacent vehicle body 12. Crown 18 must be resilient and flexible so as to maintain an overlaying engagement with the associated vehicle body which may not always be in exact alignment. Crown 18 has a stabilizing tail 40 extending downwardly from the laterally median portion of crown 18 as viewed in FIG. 2. Tail 40 enhances the resistance of crown 18 to twisting and hence detachment of crown 18 from the glass panel or body panel surface. Tail 40 nests with clamping portion 18 when installed about a windshield. Thus, facing surfaces 42 of crown 18 and 44 of clamping portion 16 are generally contiguous when clamp-on molding 10 is installed. Crown 18 is joined to clamping portion 18 at end 48 of leg 20 of clamping portion 16. The outwardly facing surface 46 of crown 18 can carry a metallized mylar or other bright work as is conventional in the art.

Clamp-on molding 10 is well-adapted to be a windshield reveal molding. Clamp-on molding 10 can accommodate uneven edges of glass, as is commonly found in the art, without becoming twisted or otherwise disengaged. Furthermore, clamp-on molding 10 can be easily installed and is stable once installed to resist disengagement due to temperature extremes, wind or the like. Clamping portion 16 uniformly engages the glass panel edge while crown 18 uniformly covers the space between the glass panel edge and the body panel edge.

Figure 3:
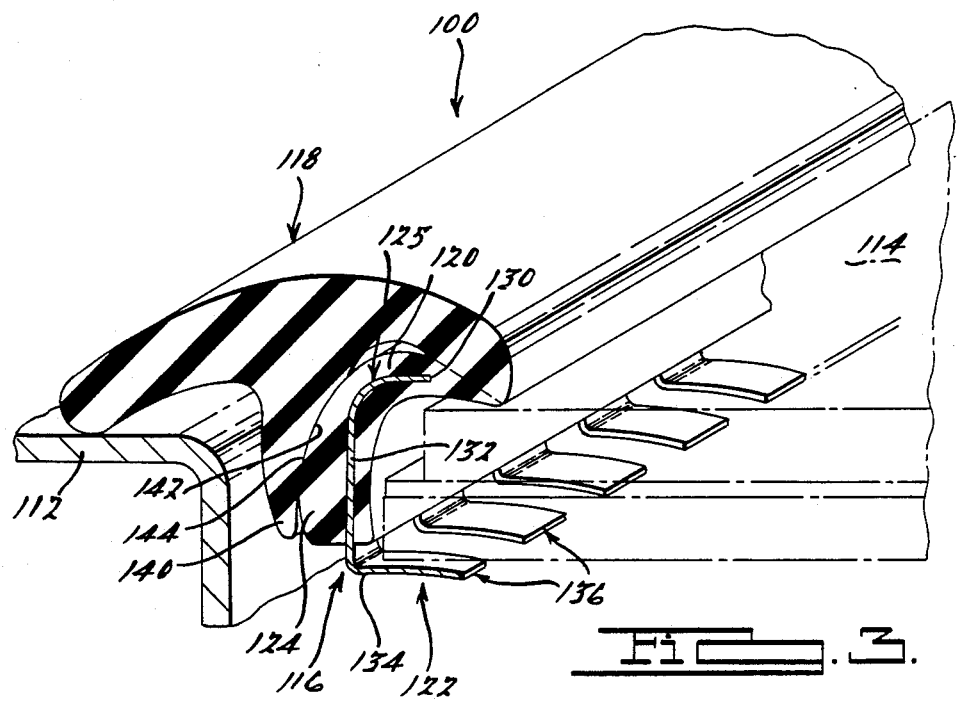
FIG. 3 is a perspective partially in cross-section view, broken away, of an alternative preferred embodiment of a reveal molding in accordance with the present invention.
Figure 4:
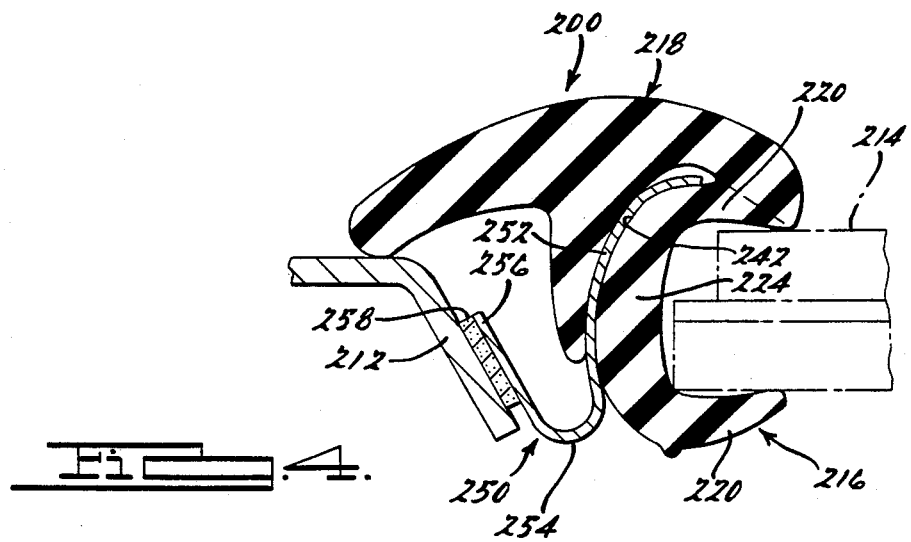
FIG. 4 is a cross-sectional view of an alternative preferred embodiment of a reveal molding in accordance with the present invention.

Now referring to FIGS. 3 and 4, alternative embodiments of the present invention are illustrated. Clamp-on glass molding 100 is shown in FIG. 3 in operative association with an automotive vehicle body panel 112 and an automotive windshield 114. Clamp-on glass molding 100 broadly comprises a C-shaped clamping portion 116 and a crown 118.

C-shaped clamping portion 116 has arcuate legs 120 and 122 and web 124 connecting the two legs. Leg 120 and web 124 are formed from elastomeric material, as explained above. Leg 122 is comprised of a metallic strip 125 embedded in the elastomeric material of the web 124 and leg 120, as seen in FIG. 3. The metallic strip 125 is C-shaped having a short leg 130, a web 132 and a long leg 134. The short leg 130 and web 132 are embedded in the elastomeric leg 120 and web 124, respectively. The long leg 134 of the metallic strip includes one or more fingers 136. The fingers 136 apply force to the bottom surface of the windshield 114. The force is substantially the same as that applied to the top surface of the windshield 114 to have a substantially even force applied to the windshield 114. Also, as explained above, the fingers 136 provide the molding 100 with increased bonding area to bond the molding 100 and windshield 114 together.

The crown 118 is substantially the same as that described herein. The crown 118 includes tail 140 and surfaces 142 and 144 which provides the properties as previously described.

FIG. 4 illustrates another embodiment of the present invention. The clamp-on glass molding 200 is in operative association with an automotive vehicle body panel 212 and an automotive windshield 214. The clamp-on molding 200 probably comprises a C-shaped clamping portion 216 and a crown 218. The C-shaped clamping portion 216 includes a pair of legs 220 and 222 connected by a web 224. The clamping portion may be like those described herein or like those defined in U.S. patent application Ser. No. 102,385, previously incorporated by reference.

The crown 218 provides an umbrella-shaped cover which extends across the space between the windshield 214 and the adjacent body 212. The crown 218 is like that previously described above having a tail 240. The tail 240 includes the properties previously described.

A securement member 250 is coupled with the molding 200. Preferably, the securement member 250, in cross-section, has an S-shaped configuration. The first arcuate portion 252 is flattened and coupled with the C-shaped portion 216 of the molding 200. The member 250 may be adhesively bonded to the surface 242 of the C-shaped member 216 or embedded therein. The second arcuate portion 254 curves away from the C-shaped portion 216. The end 256 of the second arcuate portion 254 has a member 258 to secure the member 250 to the vehicle body panel 212. The member 258 may be adhesive double face tape, tape foam or the like which securely positions the member 250 onto the vehicle body 212. Thus, the securement member 250 may be in the configuration of the outline of a window or the like, or one or more short members may be positioned about the window opening.

While the above description sets forth preferred embodiments of the present invention, it will be apparent to those skilled in the art that the present invention is subject to modification and variation within the scope and spirit of the following claims.

What is claimed is:

1. A clamp-on resilient elongated molding for edges of glass panels and the like, comprising:
   a generally C-shaped, in cross-section, clamping portion having a pair of inwardly directed clamping legs for exerting a clamping force on opposite surface of an edge portion of a glass panel or the like;
   means for increasing the bonding area of the glass panel or the like, said means associated with said C-shaped channel and comprised of a plurality of fingers in one of said clamping legs; and
   a crown having an umbrella-shaped portion and a stabilizing tail portion, said crown being joined to said C-shaped clamping portion with said tail portion in nesting relationship with said C-shaped portion when said molding is in use.

2. A clamp-on resilient elongated molding for edges of glass panels and the like, comprising:
   a generally C-shaped, in cross-section, clamping portion having a first inwardly directed leg a web portion and a second inwardly directed leg for exerting a clamping force on opposite surface of an edge portion of a glass panel or the like;
   one of said inwardly directed legs being formed from a metallic strip including a plurality of fingers for exerting the clamping force; and
   a crown having an umbrella-shaped portion and a stabilizing tail portion, said crown being joined to said C-shaped clamping portion with said tail portion in nesting relationship with said C-shaped portion when said molding is in use.

3. The clamp-on resilient elongated molding according to claim 2 wherein said clamp-on molding is formed from a polymeric material.

4. The clamp-on resilient elongated molding according to claim 3 wherein a portion of said metallic strip is embedded in said polymeric material.

5. The clamp-on resilient elongated molding according to claim 4 wherein said metallic strip is C-shaped having one leg and a web embedded in the first leg and web of the C-shaped clamping portion.

6. A clamp-on resilient elongated molding for edges of glass panels and the like, comprising:
    a generally C-shaped, in cross-section, clamping portion having inwardly directed clamping legs for exerting a clamping force on opposite surfaces of an edge portion of a glass panel or the like;
    a crown having an umbrella-shaped portion and a stabilizing tail portion, said crown being joined to said C-shaped clamping portion with said tail portion in nesting relationship with said C-shaped portion when said molding is in use; and
    means for securing said clamp-on molding to a surface, said securing means coupled with said C-shaped portion and including one or more members, each member including a portion coupled with said C-shaped portion and a second portion coupled with said surface.

7. The clamp-on resilient elongated molding according to claim 6 wherein said one or more members are elongated S-shaped members, in cross-section, having one arcuate portion coupled with said C-shaped portion and the other arcuate portion having a portion coupled with said surface.

8. The clamp-on resilient elongated molding according to claim 7 wherein said portion of said S-shaped portion coupled with said surface includes an adhesive member.

* * * * *